United States Patent [19]

Ishida et al.

[11] Patent Number: 5,144,607
[45] Date of Patent: Sep. 1, 1992

[54] OBJECTIVE LENS DRIVING DEVICE

[75] Inventors: Tomoyuki Ishida, Tokyo; Yuhei Kobayashi, Kanagawa, both of Japan

[73] Assignee: Sony Corporation, Tokyo, Japan

[21] Appl. No.: 447,082

[22] Filed: Dec. 7, 1989

[30] Foreign Application Priority Data

Dec. 29, 1988 [JP] Japan ............................ 63-334904

[51] Int. Cl.⁵ .................................................. G02B 26/10
[52] U.S. Cl. .............................. 369/44.15; 369/44.22
[58] Field of Search ............... 369/44.12, 44.13, 44.14, 369/44.15, 44.16, 44.22, 44.32, 44.11, 44.17; 359/811, 814, 824, 813, 819, 823; 360/114

[56] References Cited

U.S. PATENT DOCUMENTS

| | | | |
|---|---|---|---|
| 3,960,443 | 6/1976 | Goshima et al. | 350/247 |
| 4,653,856 | 3/1987 | Kamiko | 350/255 |
| 4,669,823 | 6/1987 | Iguma et al. | 361/44.15 |
| 4,720,088 | 1/1988 | Tamura | 369/44.16 |
| 4,766,584 | 8/1988 | Sekimoto et al. | 369/44.15 |

FOREIGN PATENT DOCUMENTS 0178077 9/1985 European Pat. Off. .
0280038 12/1986 Japan .................................. 369/44.16

OTHER PUBLICATIONS

Patent Abstracts of Japan, vol. 10 No. 260 (P-494), Sep. 5, 1986 (disclosing Japanese Patent Application -6-1-87229).
Patent Abstracts of Japan, vol. 10 No. 215 (P-481), Jul. 26, 1986 (disclosing Japanese Patent Appln. 61-54047).
Patent Abstracts of Japan, vol. 10 No. 127 (P-455), May 13, 1986 (disclosing Japanese Patent Appln. 60-253030).

Primary Examiner—Roy N. Envall, Jr.
Assistant Examiner—Hung Dang
Attorney, Agent, or Firm—Lewis H. Eslinger; Jay H. Maioli

[57] ABSTRACT

An objective lens driving device employed in an optical pickup device of a recording and/or reproducing apparatus for an optical disk adapted to perform recording and/or reproduction of data signals on or from an optical disk as a recording medium includes an objective lens bobbin mounting an objective lens, objective lens supporting members for movably supporting the objective lens bobbin in the focusing direction and in the tracking direction, and an electromagnetic driving unit for driving the objective lens in the focusing and tracking directions simultaneously with the focusing coils and the tracking coils wound about the objective lens bobbin. The objective lens supporting member is formed by bending a single spring plate in the form of a rectangular frame and includes a pair of supporting arm sections extending parallel to each other, a pair of connecting plate sections interconnecting both ends of these supporting arm sections and resilient deflective sections formed in the connecting plate sections. These resilient deflective sections may be resiliently deflected in the direction at right angles with the deflection along the direction of thickness of the supporting arm sections, which direction is the direction of thickness of the connecting plate sections.

10 Claims, 9 Drawing Sheets

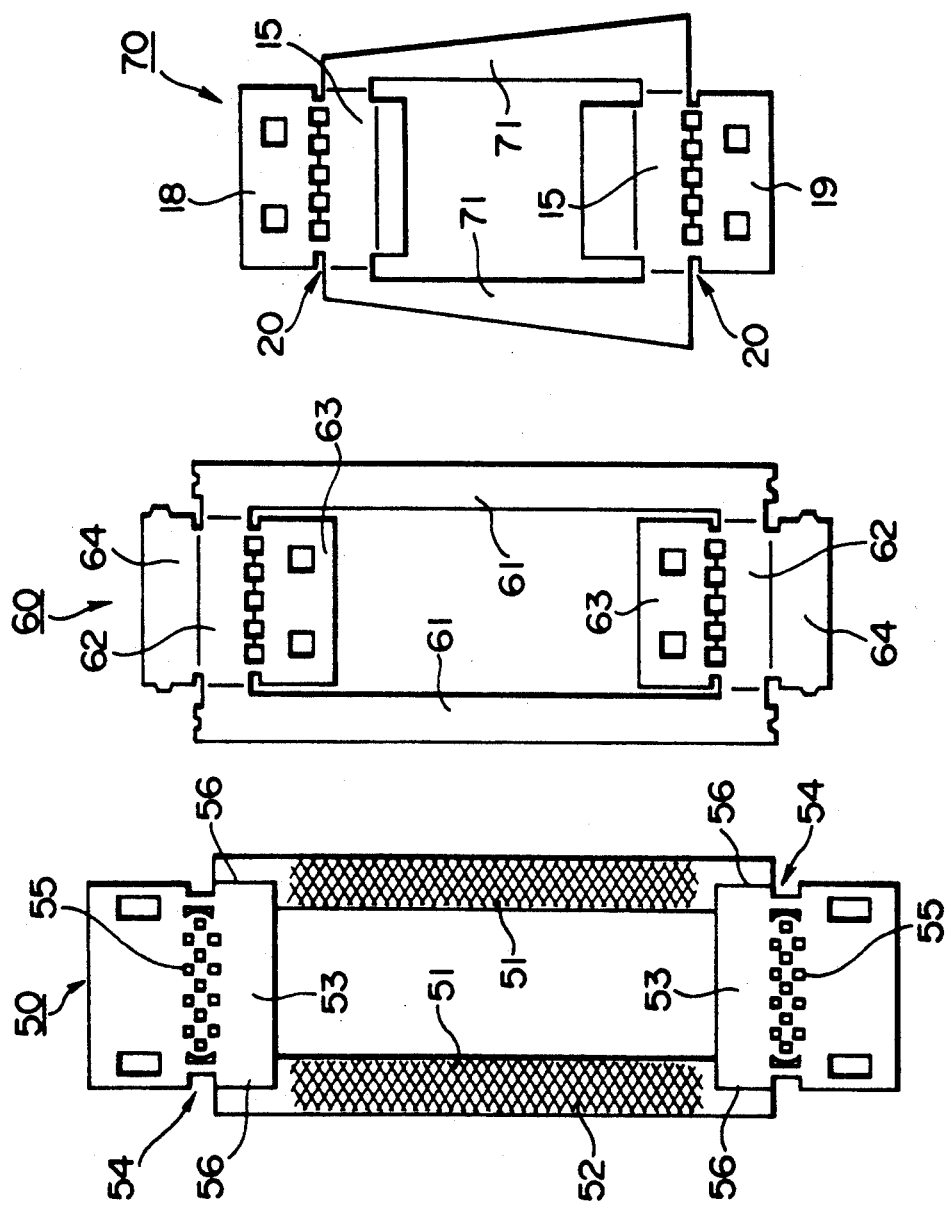

OBJECTIVE LENS DRIVING DEVICE

BACKGROUND OF THE INVENTION

1. Field of the Invention

This invention relates to an objective lens driving device employed in an optical pickup device adapted for recording and/or reproducing data signals on or from an optical recording medium such as an optical disk.

2. Related Prior Art

There has so far been used an optical pickup device in which a light beam emitted from a built-in light source such as a semiconductor laser element is converged by an objective lens and other optical devices such as a collimator lens or a beam splitter on a signal recording surface of an optical disk as the optical recording medium and the light beam reflected by the signal recording surface is detected by a photo detector to reproduce the data signals previously recorded on the optical disk, or in which desired data signals are recorded by converging a light beam on the signal recording surface.

With this type of optical pickup device, the objective lens for converging the light beam on the signal recording surface of the optical disk is movably supported in two directions orthogonal to each other, that is, in a direction along the optical axis or a focusing direction and in a direction orthogonal to the optical axis, or in a tracking direction.

Referring to FIGS. 1 and 2, this objective lens driving unit has a lens bobbin 104 supported by a supporting member 102 implanted on a base plate or substrate 101 by means of a lens bobbin supporting arm 103. The lens bobbin supporting arm 103 is constituted of a resilient material, such as a synthetic resin, and is formed with first and second hinges 103a, 103b of reduced thicknesses arranged at right angles with each other. Thus the lens bobbin 104 may be displaced or deflected in two directions, that is, in the focusing direction shown by an arrow f and in the tracking direction t shown in FIG. 1 by the lens bobbin supporting arm 103 being resiliently deformed at the hinges 103a, 103b.

To this lens bobbin 104 are attached an objective lens 105, a pair of focusing coils 106 and a pair of tracking coils 107 on the outer periphery of the focusing coils 106.

These coils 106 and 107 are confronted by a pair of magnetic yokes 108, 108 mounted on the substrate 101 and a pair of magnets 109, 109 mounted on these magnetic yokes 108, 108. Each of the magnetic yokes 108, 108 is formed by a pair of upstanding segments 108a, 108b arranged into a U-shaped element and the magnet 109 is attached to the inner lateral side of one 108a of the upstanding segments while the other upstanding segment 108b is introduced into the associated focusing coil 106 in the form of a hollow rectangular member. Each magnet 109 is confronted by the associated tracking coil 107 which is wound in the form of a flat plate and placed on the outer periphery of the associated coil 106.

The coils 106, 107, the magnetic yokes 108 and the magnets 109 make up a magnetic circuit and the driving electric current is supplied to the coils 106, 107 to drive the lens bobbin 104 in the aforementioned two axial directions.

A balancer 110 is mounted on the lens bobbin 104 on the side opposite to the objective lens 105 with respect to the second hinge 103b. By this balancer 110, the position of the center of gravity of the overall movable parts including the lens bobbin 104, object lens 105 and the coils 106, 107 is brought into registry with the hinge 103b to enable optimum driving of the lens bobbin 104 in the aforementioned two directions.

With the optical pickup device, provided with the above described objective lens driving device, the object lens 105 is driven on the basis of output signals of the photo detector to perform the focusing and tracking servo control operations.

The function of the focusing servo control is to cause the light beam irradiated on the signal recording surface to be converged accurately on the signal recording surface at all times even in cases wherein the optical disk is not rotated in a prescribed plane but rotated with undulations. Thus, as long as the focusing servo is in operation, the objective lens 105 is driven so as to be deviated so that the distance beween the lens and the optical disk is always maintained at a predetermined value.

On the other hand, the function of the tracking servo is to cause the beam spot formed by the convergence of the optical beam to accurately trace the recording track formed on the signal recording surface even when the optical disk is rotated with an offset from its center of rotation.

As the object lens supporting member supporting the object lens so that the lens may be deviated in the focusing and the tracking directions, there are so far known a supporting arm section composed of four round bars, as disclosed in our copending Japanese Patent Specification JU1-2452, or a system including a supporting arm section formed by two sets of parallel spring plates arranged in a direction at right angles with each other and a lens bobbin mounting an objective lens and supported for deviation by the supporting arm section.

With the objective lens driving device, provided with such supporting arm section, the objective lens is driven so as to be deviated on the basis of the output signal of the photosensor, by way of the focusing servo and the tracking servo control operations.

The function of the focusing servo control is to cause the light beam irradiated on the signal recording surface to be converged accurately on the signal recording surface at all times even when the optical disk is not rotated in a prescribed plane but rotated with undulations. Thus, as long as the focusing servo is in operation, the objective lens 105 is driven so as to be deviated so that the distance between the lens and the optical disk is always maintained at a predetermined value.

However, difficulties are presented in the objective lens driving device adapted for supporting the objective lens using four supporting arms composed of the round bars, as shown in the Japanese Patent Specification JU1-2452 in connection with manufacture and assembling because each supporting arm must be attached to the lens bobbin supporting the objective lens.

Also a jumper wire must be provided between the lens bobbin and some stationary portion in order to supply the driving current to the tracking coil and the focusing coil provided in the lens bobbin as the movable member.

This jumper wire must be formed by an extremely thin wire, such as a litz wire, which is sufficiently flexible so as to be displaced to follow the lens bobbin without excess load application during movement of the objective lens. Since this litz wire line is thin and has only minimal mechanical strength, it need be handled with caution, so that difficulties are presented in the wire connecting operation.

Hence, in the above cited Japanese Patent Specification JP1-37733, the supporting arm is formed by two sets of parallel spring plates constituted as the printed circuit board and arranged in directions at right angles with each other.

However, in this case, it becomes necessary to provide an intermediate pillar portion interconnecting a first spring plate displacing the objective lens in the longitudinal or focusing direction and a second spring plate displacing the objective lens in the transverse or tracking direction, so that the weight of the device is increased and hence the device may be subjected to vibrations due to partial resonance in addition to those at the resonant frequency which is determined by the weight of the supporting arm and the movable parts. The vibrations due to partial resonance frequently prove to be harmful resonant vibrations against the biaxial driving of the supporting arms.

On the other hand, when driving the lens bobbin in the focusing direction and/or tracking direction, it is desirable that the first or the second spring plate be displaced only in a direction normal to the other spring plate. However, in practice, partial flexures or distortions are produced, such that not only can the objective lens not be displaced responsive to the control driving current in the focusing and tracking directions with high response characteristics, but harmful resonant vibrations are produced due to the partial flexure or distortions.

On the other hand, with the objective lens driving device, shown in FIG. 1, since the lens bobbin supporting arm 103 is formed of synthetic resin, the resin material may be changed in its properties with the prevailing temperature of the objective lens driving device so that the characteristics of the focusing servo or the tracking servo may be delicately affected to render stable focusing and tracking servo control operations unfeasible. In addition, the thicknesses of the first and second hinges are difficult to control, such that fluctuations in these thicknesses give rise to fluctuations in the spring constants of the hinges and hence it becomes difficult to render the properties of the hinges uniform in the case of mass production.

Also, with the objective lens driving unit shown in FIGS. 1 and 2, the magnetic yokes 108, 108, facing the lens bobbin, are formed by bending a sheet metal into the form of a letter U and are placed on the base plate so that the magnets and the coils of the lens bobbin face each other. Since the electro-magnetic force produced by the magnets of the yokes and the servo current supplied to the focusing and tracking coils of the lens bobbin acts at a site spaced away from a set screw 111 fastening the base plate 100, the magnetic yokes 108, 108 cannot be secured sufficiently, such that excess vibrations may be brought about in the magnetic yokes 108, 108 due to the aforementioned electromagnetic force. Above all, inasmuch as the magnetic yokes 108, 108 are upstanding and hence are free at the distal parts, the segment 108b may be subjectd to vibrations as indicated by the broken lines in FIG. 3.

These vibrations tend to affect the follow-up movement of the lens bobbon responsive to the servo signal to give rise to focusing or tracking errors such that it becomes impossible to perform recording and/or reproduction of data signals with sufficient recording and/or reproducing characteristics.

OBJECT AND SUMMARY OF THE INVENTION

It is therefore an object of the present invention to provide an objective lens driving device employing an objective lens supporting member supporting the objective lens in such a manner as to eliminate harmful resonant vibrations during its operation.

It is another object of the present invention to provide an objective lens driving device in which vibrations of the magnetic yokes forming a part of the magnetic circuit section may be inhibited without making use of a fastener for suppressing the vibrations.

For accomplishing the above object, the present invention provides an objective lens driving device employed in an optical pickup device of a recording and-/or reproducing apparatus for an optical disk adapted for recording and/or reproducing data signals on or from an optical recording medium comprising an objective lens supporting member formed by bending a frame-shaped rectangular spring sheet and including a pair of supporting arm sections extending parallel to each other and a pair of connecting plate sections interconnecting both ends of said supporting arm sections, said connecting plate sections being formed with resilient deflectible sections which may be resiliently deflected only in the direction normal to the deflection along the thickness of the supporting arm sections or in the direction of thickness of the connecting plate section, an objective lens bobbin in which an objective lens and driving coils are mounted and which is supported for deflection in a direction parallel to the optical axis of the objective lens and within a plane orthogonal to the optical axis of the objective lens, and magnets supported within a magnetic yoke and mounted for facing the driving coils. According to the present invention, the magnetic yoke is formed by a rectangular frame.

With the objective lens driving device of the present invention, the objective lens supporting member supporting the objective lens may be resiliently deflected only in two directions normal to each other by the supporting arm sections of the objective lens supporting member and the resilient deflectible sections of the connecting plate sections, so that focusing and tracking servo control may be applied to the objective lens in the focusing and tracking directions. The objective lens supporting member is formed by a sole plate spring member, so that the resonant frequency becomes uniform as a whole to prevent the occurrence of vibrations due to partial resonance.

Also, according to the present invention, the four sides each of the magnetic yoke formed by a rectangular frame may be secured strongly to one another with autonomous position regulation.

The above and other objects, features and advantages of the present invention will be apparent from the following detailed description of illustrative embodiments thereof when read in conjunction with the accompanying drawings in which corresponding parts are identified by the same reference numerals.

BRIEF DESCRIPTION OF THE DRAWINGS

FIGS. 10 to 14 are developed plan views showing modifications of the objective lens supporting members.

DETAILED DESCRIPTION OF PREFERRED EMBODIMENTS

Figure 1:
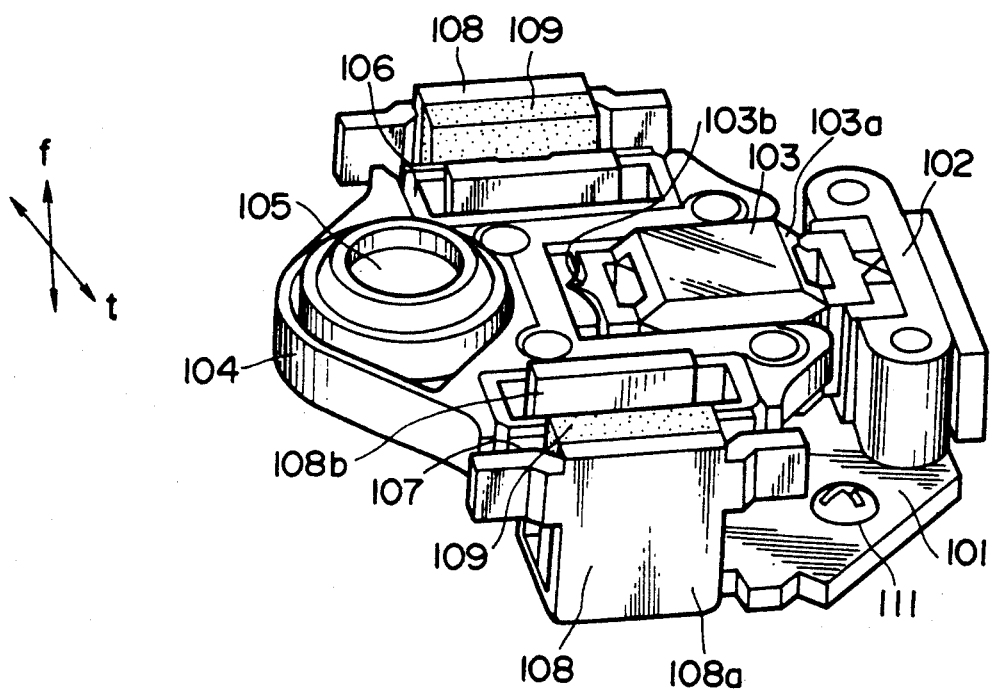
FIG. 1 is a perspective view showing a conventional objective lens driving device.
Figure 2:
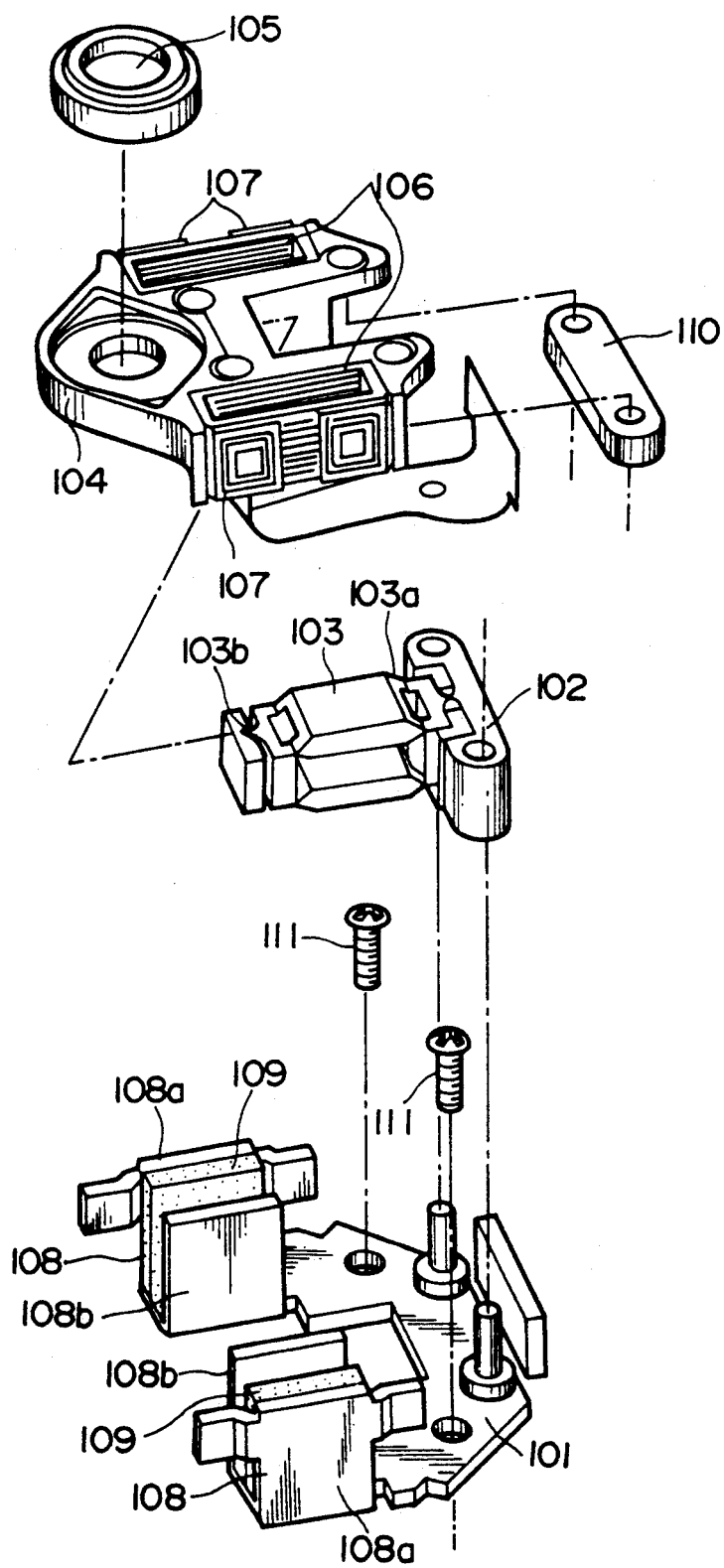
FIG. 2 is an exploded perspective view of the objective lens driving device shown in FIG. 1.
Figure 3:
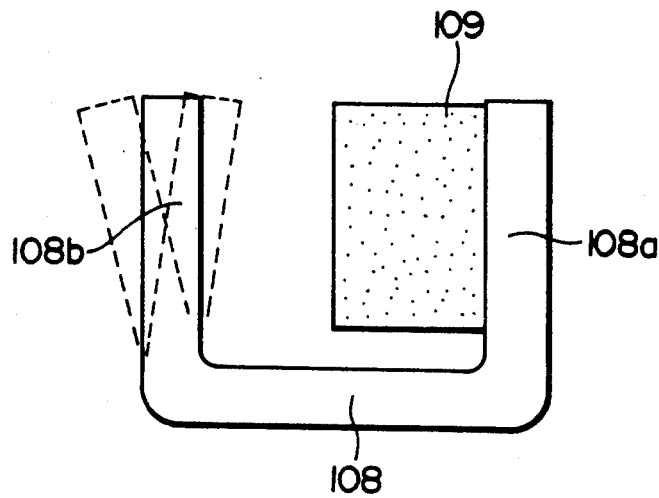
FIG. 3 is a diagrammatic view, shown to an enlarged scale, showing the state of vibrations of the magnetic yoke employed in the conventional objective lens driving device.

By referring to the drawings, certain preferred embodiments of the present invention will be explained in detail.

The objective lens driving device of the present invention is applied to an optical pickup device and is so designed and constructed that the light beam emitted by an optical block including a light source, such as a semiconductor laser element, a photosensor such as a photodiode and other optical devices is irradiated and converged on the signal recording surface of the optical recording medium, such as an optical disk.

Figure 4:
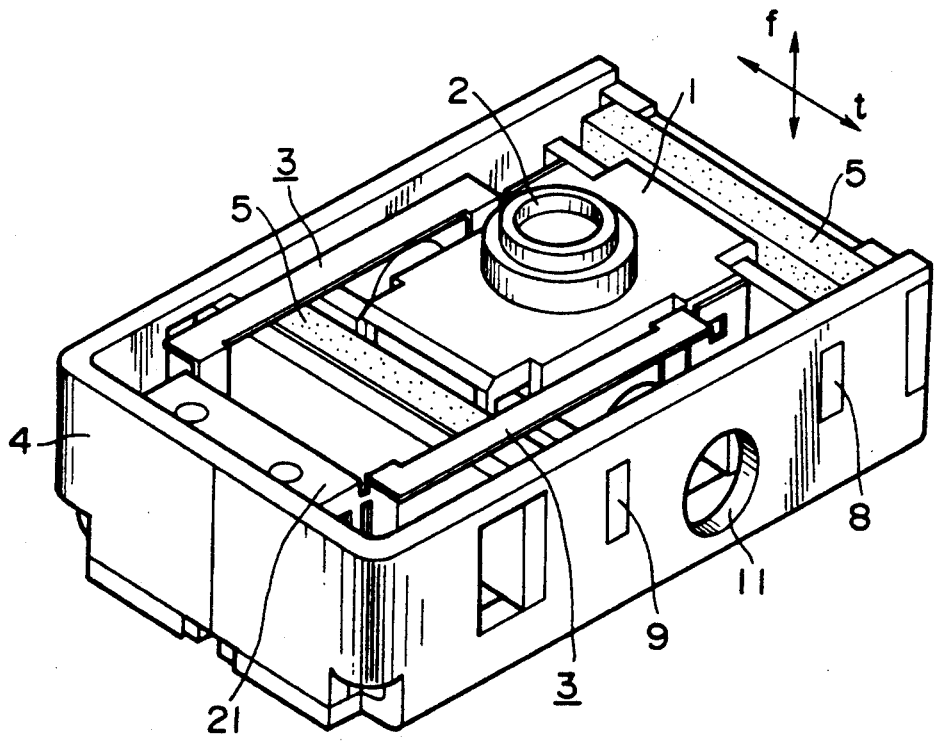
FIG. 4 is a perspective view showing an objective lens driving device according to the present invention.
Figure 5:
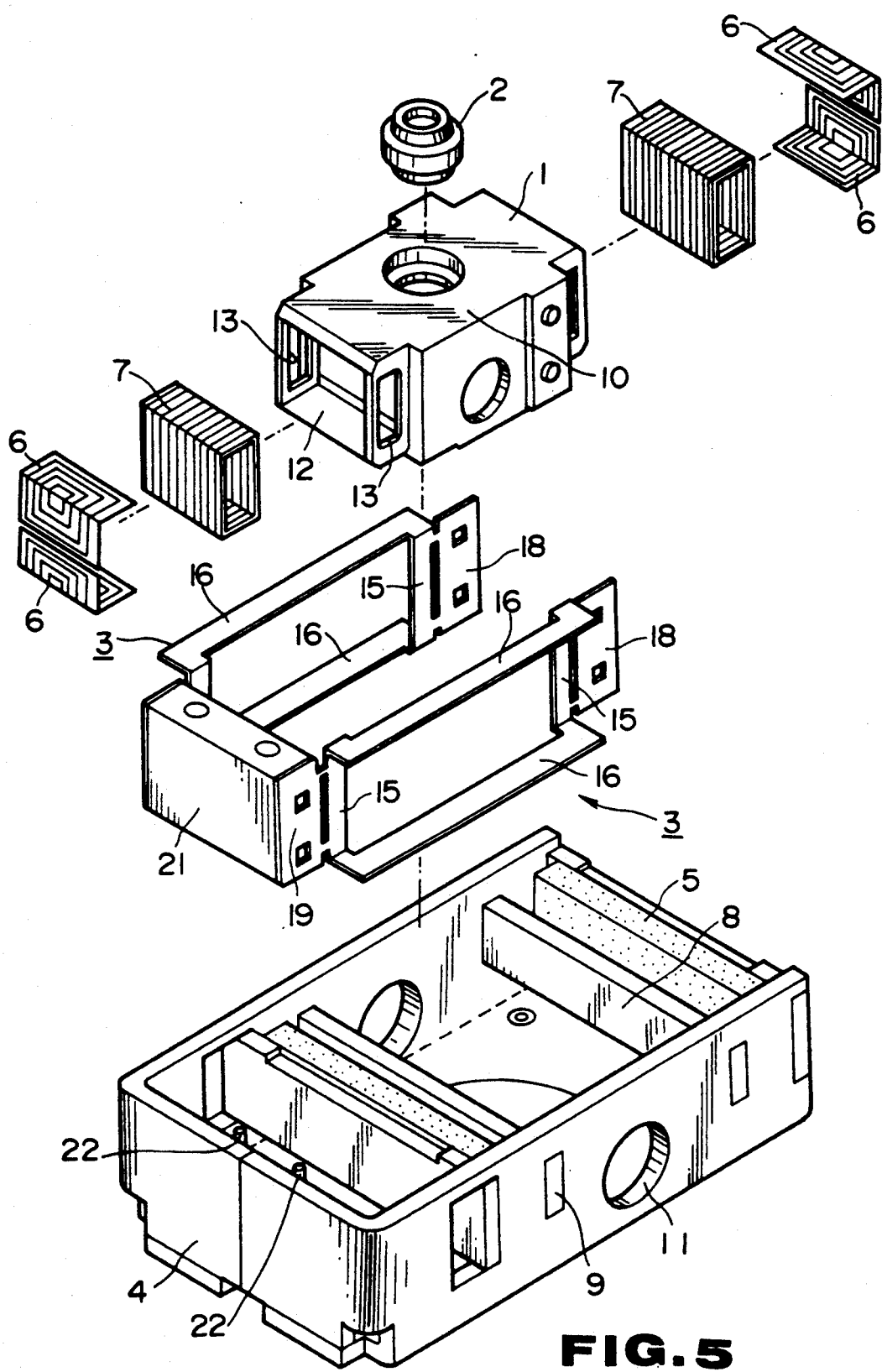
FIG. 5 is an exploded perspective view showing an objective lens driving device according to the present invention.

Referring to FIGS. 4 and 5, the objective lens driving device includes an objective lens 2 supported by a lens bobbin 1, an objective lens supporting member 3 supporting the objective lens 2 for swinging movement, driving coils 6, 7 mounted to the lens bobbin 1, magnets 5 mounted for facing the driving coils 6, 7 and a magnetic yoke 4 supporting the magnets 5.

The lens bobbin 1 is supported by the objective lens supporting members 3 within the magnetic yoke 4 arranged as a rectangular frame so that the lens bobbin 1 faces the magnets 5 mounted within the magnetic yoke 4.

Figure 6:
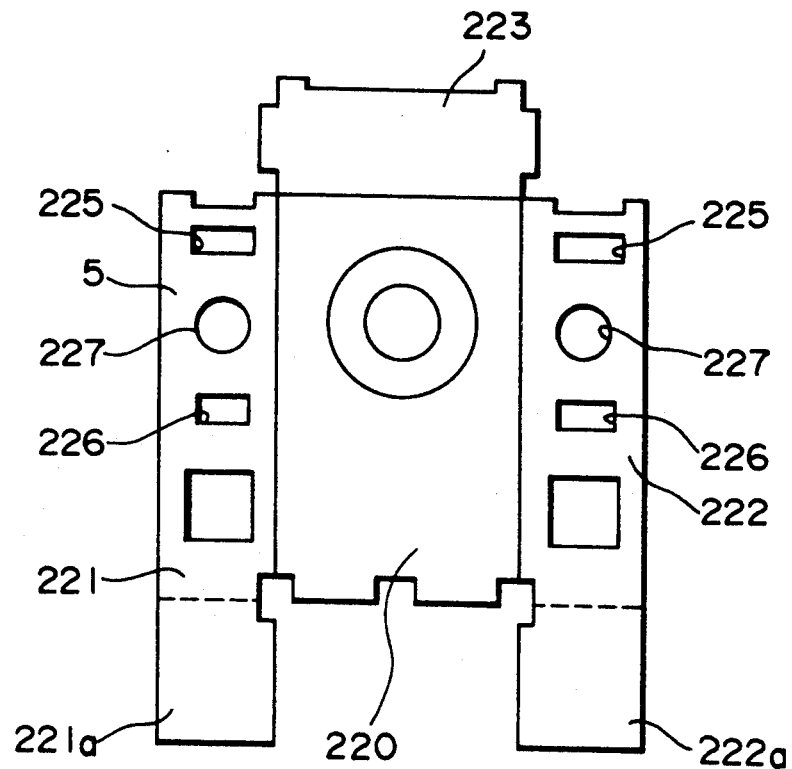
FIG. 6 is a developed plan view of a magnetic yoke employed in the objective lens driving device according to the present invention.

The magnetic yoke 4 accommodating the lens bobbin 1 is formed from a flat metal plate of high magnetic permeability as shown in FIG. 6, wherein three flaps on the three sides of the sheet metal plate are bent into upright peripheral wall sections. Thus the magnetic yoke 4 is formed by a bottom plate 220, side plates 221, 222 and a connecting plate 223, with the side plates 221, 222 being bent with respect to the bottom plate 220 to form the side wall sections and lugs 221a, 222a of the side plates 221, 222 being bent and connected to each other to form a rear side wall. The connecting plate 223 is also bent with respect to the bottom plate 220 to form the front wall. The side walls are connected to one another such as by welding to complete a rectangular frame. By forming the yoke 4 as the rectangular frame, the side walls are secured strongly to each other and reinforce one another to prevent the vibrations from occurring at the free ends of the side walls.

Figures 7A, 7B:
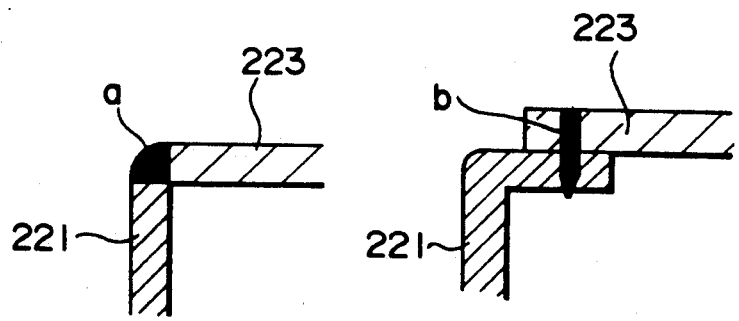
FIGS. 7A and 7B are diagrammatic partial sectional views showing the state of connection of the sides of the magnetic yoke.

The side walls may be secured together such as by butt welding a as shown at A in FIG. 7A or by spot welding b as shown at B in FIG. 7B. The four sides of the frame can be strongly unified to one another.

According to the present invention, it suffices that the yoke be formed as a rectangular frame, such that the bottom plate may occasionally be dispensed with. Thus a plurality of sheet metal sections may be united together without bending the sole metal sheet material.

To the lens bobbin 1, the focusing coils 6 and the tracking coils 7 are mounted as the driving coils for driving the objective lens 2 in the two directions. A magnetic circuit is defined along with the magnets 5,5 which are attached to the magnetic yoke 4 for facing the lens bobbin 1. Thus the objective lens 2 may be driven biaxially within the magnetic yoke 4. A pair of inner yokes 8, 9 are mounted to the magnetic yoke 4 for interconnecting the confronting side walls and for being introduced into the tracking coils 7 of the lens bobbin 1 for regulating the movable range of the objective lens 2. These inner yokes 8, 9 interconnect and reinforce the side walls of the yoke 4 to more completely prevent the vibrations at the freeboard region of the side walls.

The objective lens 2 mounted on the lens bobbin 1 is so designed and constructed that the light beam emitted from the optical block is converged on the signal recording surface. This objective lens 2 is attached to the upper surface of the lens bobbin 1 formed of synthetic resin, with the light beam falling on the objective lens 2 after being bent 90° by a folding mirror 10 mounted within the bobbin. The side walls of the magnetic yoke 4 are provided with central throughholes 11 for transmitting the light beam to the folding mirror 10.

Coil housing sections 12 are provided on both sides of the lens bobbin 1 perpendicular to the light beam bending direction. The coil housing sections 12 of the lens bobbin 1 are provided on both sides thereof with apertures 13 by which the tracking coils 7 into which the inner yokes 8, 9 may be introduced, may be introduced into the coil housing sections.

Thus the two tracking coils 7, 7 are mounted to front and rear sides of the lens bobbin 1. The focusing coils 6, 6 are mounted on the outer lateral sides of these tracking coils 7.

Figure 8:
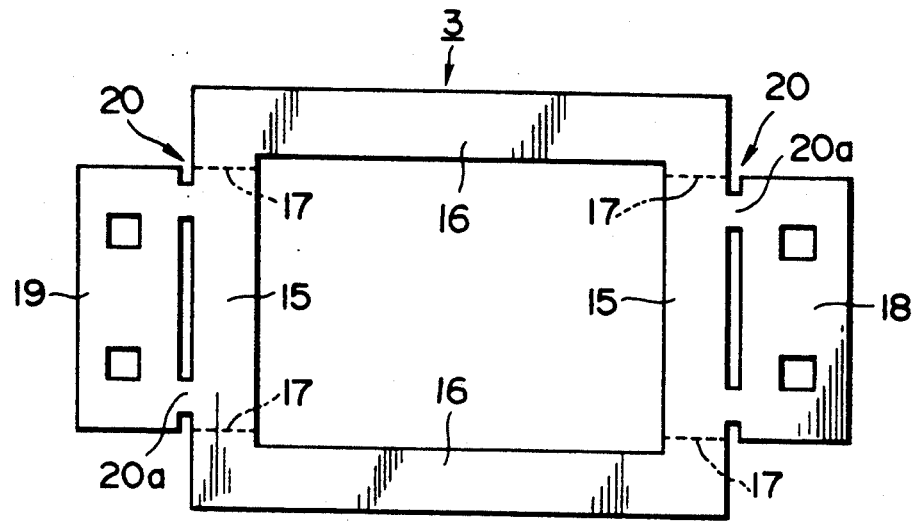
FIG. 8 is a developed plan view showing an objective lens supporting member.

The objective lens supporting member 3, supporting the objective lens 2 for swinging movement in two directions at right angles with each other, is formed from a thin metal sheet, such as a stainless steel sheet. Thus the objective lens supporting member is formed by bending a sole rectangular spring plate, as shown in FIG. 8.

Figure 9:
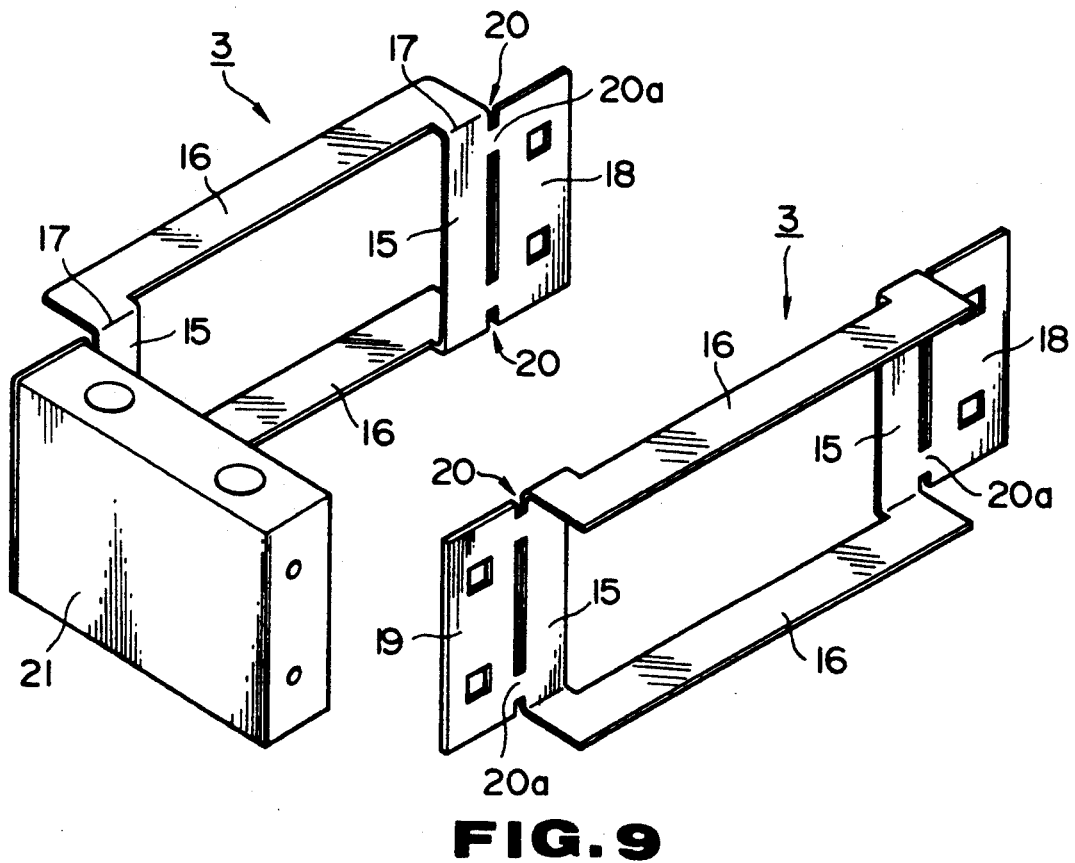
FIG. 9 is an exploded perspective view showing the state of connection of the sides of a pair of objective lens supporting members.

The objective lens supporting member 3, in the form of the rectangular frame, is formed by a pair of supporting plate sections 16, 16 extending parallel to each other and a pair of connecting plate portions 15, 15 interconnecting the ends of these supporting plate sections. As shown in FIG. 9, the supporting plate sections 16, 16 are bent 90° with respect to the connecting plate sections 15, 15 to form upper and lower arm sections. These plate or arm sections 16, 16 function as plate springs in the longitudinal direction and may be resiliently deflected in the direction of thickness. The folding section of the supporting plate sections 16, 16 are weakened as at 17 to facilitate the bending.

On the outer sides of the connecting plate portions 15, 15 are formed supporting segments or flaps 18, 19 are connected by resilient deflecting sections 20 which may be deflected only in the direction normal to the deflection in the direction of thickness of the supporting arm sections 16, 16, or in the direction of thickness of the connecting plate sections 15, 15.

These resilient deflecting sections 20 are constituted by two connecting sections 20a of reduced width between the connecting plate section 15, 15 and the supporting segments or flaps 18, 19, and are formed as hinges that may be deflected resiliently in the direction of thickness of the connecting plate sections 15, 15. These resilient deflecting sections 20, 20 are provided at the connecting plate sections 15, 15.

The supporting segment 18 is connected to the lens bobbin 1 supporting the objective lens 2, while the supporting segment 19 is connected to a supporting member 21. There is no limitation to the type of connection of the supporting segments 18, 19 to the lens bobbin 1 or to the supporting member 21, such that any means capable of strongly securing the objective lens supporting member 3 to the lens bobbin 1 or to the supporting member 21, such as set screws or adhesives, may be employed.

The function of the supporting member 21 is to support the objective lens supporting member 3 within the magnetic yoke 4. That is, the supporting member 21 is mounted by support shafts 22 provided in the magnetic yoke 4 to support the objective lens supporting member 3 within the magnetic yoke 4. The objective lens 2 may swing within the magnetic yoke 4 in two directions at right angles with each other by means of the supporting arm sections 16, 16 of the objective lens supporting member 3, and by means of the resilent defective sections 20 provided in the connecting plate sections 15, 15. In the present embodiment, the objective lens supporting members 3 are mounted on both sides of the lens bobbin 1 for supporting the objective lens 2.

The focusing coils 6, 6 of the lens bobbin 1 supported by the objective lens supporting member 3 face the magnets 5 within the magnetic yoke 4, while the inner yokes 8, 9 are introduced into the tracking coils 7. These coils 6, 7, the magnets 5 and the magnetic yoke 4 make up the magnetic circuit.

When the focusing driving current is supplied to the focusing coils 6, with the objective lens 2 being supported for swinging biaxially by the objective lens supporting member 3, the lens bobbin 1 is driven so as to be deflected along the optical axis of the objective lens 2 shown by an arrow f in FIG. 4, that is, in the focusing direction. On the other hand, when the tracking drive current is supplied to the tracking coils 7, the lens bobbin 1 is driven so as to be deflected along the direction normal to the optical axis of the objective lens 2 shown by an arrow t in FIG. 4, that is, in the tracking direction.

Despite the simplified structure of the above described objective lens supporting members 3, the objective lens can be resiliently deflected along two directions by simply bending the supporting plate sections of the spring plates 16, 16 in the form of a rectangular frame by 90° with respect to the connecting plate sections 15, 15.

The objective lens supporting member 3 is formed by bending a sole spring plate of a homogeneous material, and is formed by the same component for the two directions, so that the resonant frequency becomes constant as a whole to prevent occurrence of the harmful resonant vibrations. Above all, in the tracking direction, occurrence of the resonant vibration in the resilient deflective section 20 may be prevented positively because of the fine deformation points of the resilient deflective sections 20.

On the other hand, with the above described objective lens supporting member 3, the supporting arm sections 16, 16 and the connecting plate sections 15, 15 are deflected only in directions at right angles with each other. Thus the flexure or deflection may be prevented from occurring in driving the objective lens for improving response characteristics.

Thus, by supplying the prescribed driving current to the driving coils, the lens bobbin 1 may be driven to prescribed positions to perform focusing and tracking servo control operations reliably.

For supplying the current to the driving coils 6 and 7 for driving the objective lens 2 from the main body of the recording and/or reproducing apparatus, a flexible printed circuit board may be bonded to the surface of the objective lens supporting member 3. In this manner, the current can be supplied easily to the coils 6 and 7, while the force of the resilient deflection or the vibration attenuating characteristics of the supporting arm sections 16, 16 can also be adjusted by the flexible printed circuit board.

A modified example of the objective lens supporting member is explained by referring to FIGS. 10 to 14.

Figure 10:
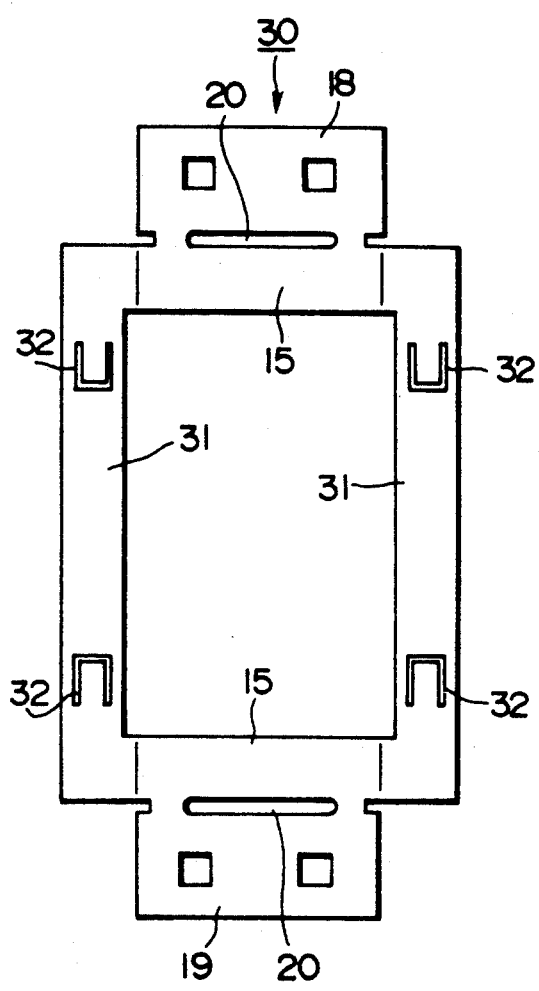

A spring plate 30 constituting an objective lens supporting member, in the form of a rectangular frame, as shown in FIG. 10, has supporting plate sections 31, 31 formed with U-shaped slits 32.

These slits 32 function to adjust the force of resilient deflection of the supporting arm sections constituted by the supporting plate sections 31, 31.

For maintaining the balanced state of the supporting arm sections, these slits 32 are provided preferably symmetrically in the two plate sections 31, 31.

Figure 11:
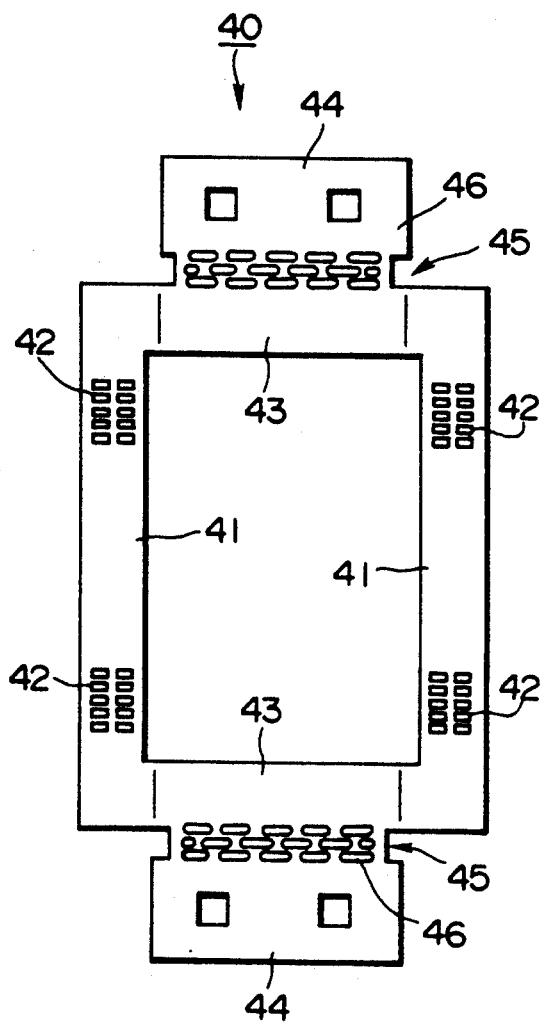

A spring plate 40 constituting an objective lens supporting member, in the form of a rectangular frame, as shown in FIG. 11, has supporting plate sections 41, 41 formed with a plurality of tiny slits 42 for adjusting the force of resilient deflection of the supporting arm sections constituted by the supporting plate sections 41, 41.

The spring plate 40 in the form of a rectangular frame, shown in FIG. 11, also has resilient deflective sections 45 formed by a number of tiny slits 46, these resilient deflective sections 45 functioning to resiliently deflectibly connect the connecting plate sections 43, 43 with the supporting sections 44, 44 in a direction at right angles with the deflecting direction of the supporting arm sections formed by the supporting plate sections 41, 41. The force of resilient deflection of the resilient deflecting sections 45 may be adjusted by forming the resilient defective sections in this manner by the tiny slits 46.

A spring plate 50 constituting the objective lens supporting member, shown in FIG. 12, has the supporting plate sections 51, 51 formed by mesh-like sections 52. The force of the resilient deflection of the supporting arm sections constituted by the supporting plate sections 51, 51 may also be adjusted by forming the supporting plate sections 51 as the meshed sections 52.

On the other hand, resilient deflective sections 54, formed in the connecting plate sections 53, 53, are formed with a large number of tiny holes 55.

Moreover, with the spring plate 50 in the form of the rectangular frame, shown in FIG. 12, fold lines 56 along which the supporting plate sections 51, 51 are bent to form the supporting arm sections are formed at the mid positions along the widths of the supporting plate sections 51, 51.

With the fold line 56 at the mid position along the width of each of the supporting plate sections 51, 51, the points of deflection at the resilient deflective sections 54 of the connecting plate sections 53, 53 and the centerlines of the supporting arms constituted by the supporting plate sections 51, 51 are aligned with one another to suppress further the vibrations due to partial resonance at the connecting points between the supporting arm sections and the connecting plate sections.

A spring plate 60 constituting the objective lens supporting member, in the form of a rectangular frame, shown in FIG. 13, has supporting plate sections 61, 61 extended longitudinally, and is provided with inner supporting segments 63, 63 and outer reinforcements 64, 64 with respect to connecting plate sections 62, 62. The function of these reinforcements 64, 64 is to reinforce the ends of the supporting arms to suppress further the distortions or strain of the supporting arms by being connected to the ends of the supporting arm sections constituted by the supporting plate sections 61, 61. If the distortion or strain of the supporting arms can be prevented from occurring in this manner, these supporting arms may be resiliently deflected only in a direction orthogonal to the connecting plate sections 62 to improve further the response characteristics of the objective lens supported by the object lens supporting member constituted by the spring plate 60 in the form of a rectangular frame.

A spring plate 70 in the form of a rectangular frame, shown in FIG. 14, has supporting plate sections 71, 71 of different widths at the two ends. The resilient deflective force of the supporting arms constituted by these supporting plate sections 71, 71 may be adjusted in this manner by having the supporting plate sections 71, 71 of differing widths from one end to the other.

The above described modifications of the objective lens supporting members may also be combined in any desired manner to provide various resilient deflective forces as a function of the driving characterisics required of the objective lens 2.

Figure 15:
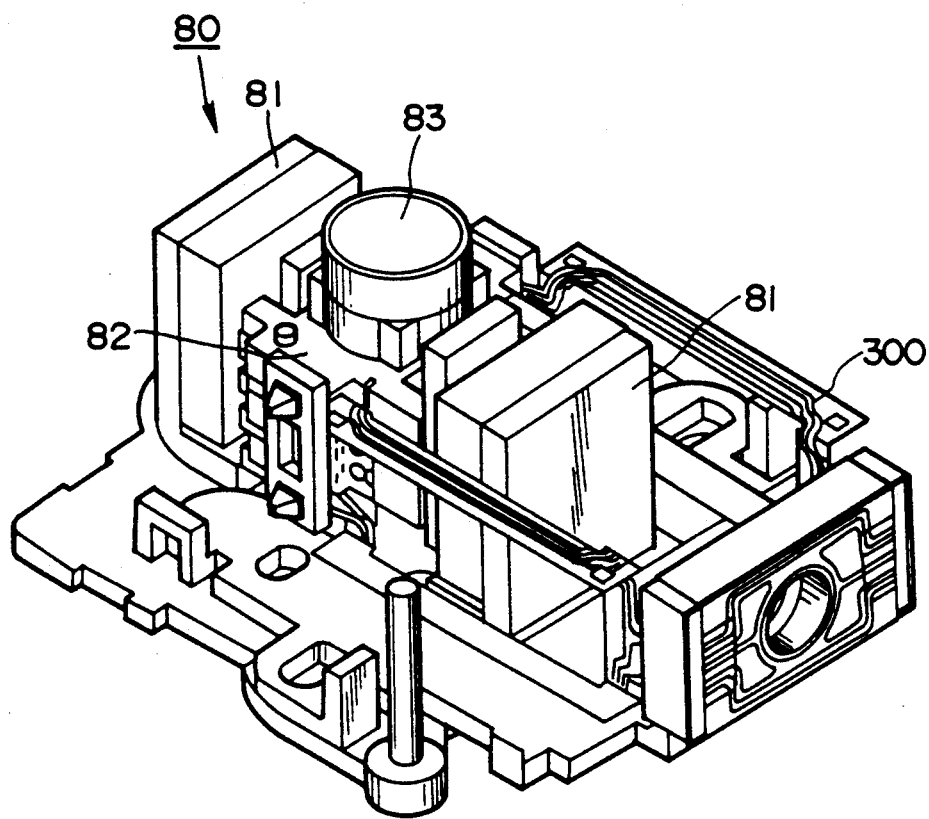
FIG. 15 is a perspective view of an objective lens driving device according to a modification of the present invention.

The objective lens driving device according to the present invention is not limited to the above described embodiment in which the magnetic yoke 4 has the form of a rectangular frame and is provided with inner yokes. Thus the above described objective lens supporting member 3 may also be employed in an objective lens driving device 80 provided with a U-shaped upright magnetic yoke 81 as shown in FIG. 15. In this case, there is no necessity of providing a light path bending mirror within the lens bobbin 82, but the outgoing light beam to the objective lens 83 may also be guided from below the lens bobbin 82.

In this FIGURE, there is shown an embodiment in which a printed wiring base plate 300 is adhered to the objective lens supporting member 3.

With the objective lens driving device according to the present invention, the objective lens can be resiliently deflected in two directions lying at right angles with each other by the supporting arm sections and the connecting plate sections of the objective lens supporting members supporting the objective lens. Focusing servo and tracking servo control operations in the focusing and tracking directions of the objective lens may be performed while the resonant vibrations are eliminated by the objective lens supporting members.

Resilient deflection of the objective lens in the above two directions may be realized by an extremely simple arrangement of the objective lens supporting members in which the supporting plate sections of the sole spring plates in the form of a rectangular frame are bent 90°.

On the other hand, each objective lens supporting member is formed only by the spring plate, so that the resonant frequently of the supporting member as a whole becomes constant to suppress the occurrence of harmful partial resonant vibrations at the time of the driving. Above all, in the tracking direction, resonant vibrations in the resilient deflective sections may also be prevented from occurring due to finer points of deformation in these sections.

Thus the tracking and focusing servo control operations for the objective lens may be realized highly accurately to improve driving characteristics of the object lens.

The magnetic yoke constituting the objective lens driving device of the present invention is formed as a rectangular frame which is strongly assembled with autonomous position regulation of the four sides of the frame.

Consequently, with the objective lens driving device according to the present invention, wasteful vibrations of the yokes may be prevented from occurring when the current is supplied to the coils during driving of the lens bobbin. Thus the tracking servo and focusing servo control of the lens bobbin may be perfomed highly accurately.

Also, in the tracking servo and focusing servo, the driving characteristics of the objective lens may be improved without being affected by the other members.

In addition, with the objective lens driving device of the present invention, the members subject to vibration, including the objective lens, are arranged within the yoke protection to guard against possible injuries.

What is claimed is:

1. An objective lens driving device employed in an optical pickup device of a recording and/or reproducing apparatus for an optical disk adapted for recording and/or reproducing data signals on or from an optical recording medium comprising:

an objective lens bobbin including an objective lens having an optical axis;

first and second objective lens supporting members arranged on either side of said lens bobbin and each formed from a respective frame-shaped rectangular plate spring member and each including a pair of upper and lower resiliently deflectable supporting arm sections extending parallel to each other and being respectively arranged on an upper side and a lower side of said bobbin, each of said first and second objective lens supporting members including a respective pair of connecting plate sections interconnecting respective ends of said upper and lower supporting arm sections to each other, said connecting plate sections being formed with resiliently deflectable sections for deflection only in a direction normal to the optical axis of the objective lens, said objective lens bobbin further including driving coils and being supported for deflection by said first and second objective lens supporting members in a direction parallel to the optical axis of the objective lens by said pairs of upper and lower supporting arm sections and within a plane orthogonal to the optical axis of the objective lens by said resiliently deflectable sections of said connecting plate sections, and a plurality of magnets supported within a magnetic yoke and arranged facing the driving coils of said objective lens bobbin.

2. The objective lens driving device according to claim 1 wherein said upper and lower supporting arm sections are each bent 90° from its respective plate spring member with respect to the respective connecting plate sections.

3. The objective lens driving device according to claim 1 wherein said resiliently deflective sections are formed by a plurality of mutually separate, spaced-apart connecting sections.

4. The objective lens driving device according to claim 1 wherein said resiliently deflective sections are formed with a plurality of tiny slits in said connecting plate sections.

5. The objective lens driving device according to claim 1 wherein each of said upper and lower supporting arm sections in said first and second lens supporting members is provided with adjustment means for adjusting a force necessary for the resilient deflection thereof.

6. The objective lens driving device according to claim 5 wherein the adjustment means are in the form of U-shaped slits formed in each of said upper and lower supporting arm sections.

7. The objective lens driving device according to claim 5 wherein said adjustment means comprise a plurality of slits formed in each of said upper and lower supporting arm sections.

8. The objective lens driving device according to claim 5 wherein said adjustment means comprise mesh sections formed integrally in said connecting arm sections connecting said upper and lower supporting arm sections in said first and second supporting members, respectively.

9. The objective lens driving device according to claim 1 wherein said upper and lower supporting arm sections are of different widths at one end than at the other end, respectively.

10. The objective lens driving device according to claim 1 further comprising a printed wiring board adhered to one of said plurality of objective lens supporting members.

* * * * *